United States Patent [19]

Carmien

[11] 4,030,847

[45] June 21, 1977

[54] ADAPTER FOR FIBERGLASS TOOL HANDLES AND OTHER FIBERGLASS CONNECTIONS

[75] Inventor: Joseph Allen Carmien, Sun Valley, Calif.

[73] Assignee: Nupla Corporation, Sun Valley, Calif.

[22] Filed: June 10, 1976

[21] Appl. No.: 694,844

[52] U.S. Cl. .............................. 403/263; 145/29 R; 403/369

[51] Int. Cl.² ........................................ F16B 21/00

[58] Field of Search .......... 403/263, 243, 369, 365, 403/344, 255, 247; 145/61 C, 61 E, 61 EA, 29 R, 29 B; 125/41, 42, 43; 74/543

[56] References Cited

UNITED STATES PATENTS

| 2,917,349 | 12/1959 | Saylor et al. | 403/243 X |
| 3,657,943 | 4/1972 | Bruhn et al. | 403/365 X |
| 3,753,602 | 8/1973 | Carmien | 403/369 |
| 3,819,288 | 6/1974 | Carmien | 403/369 X |

FOREIGN PATENTS OR APPLICATIONS

| 25,792 | 1897 | United Kingdom | 403/247 |

*Primary Examiner*—Wayne L. Shedd
*Attorney, Agent, or Firm*—Robert C. Comstock

[57] ABSTRACT

An adapter for connecting a tool head to a fiberglass tool handle or shaft. The adapter includes a cap having greater compressive strength than the handle. The cap fits over the end of the handle to prevent damage during assembly, use or storage of the tool. A pair of adapter sections fit around the cap and the adjacent end of the handle. The adapter sections have recesses which receive the ends of the cap. A pair of pins carried by the adapter sections extend into openings in the handle. The cap also acts as a guide to provide proper alignment of the adapter sections and tool head with respect to the handle.

8 Claims, 6 Drawing Figures

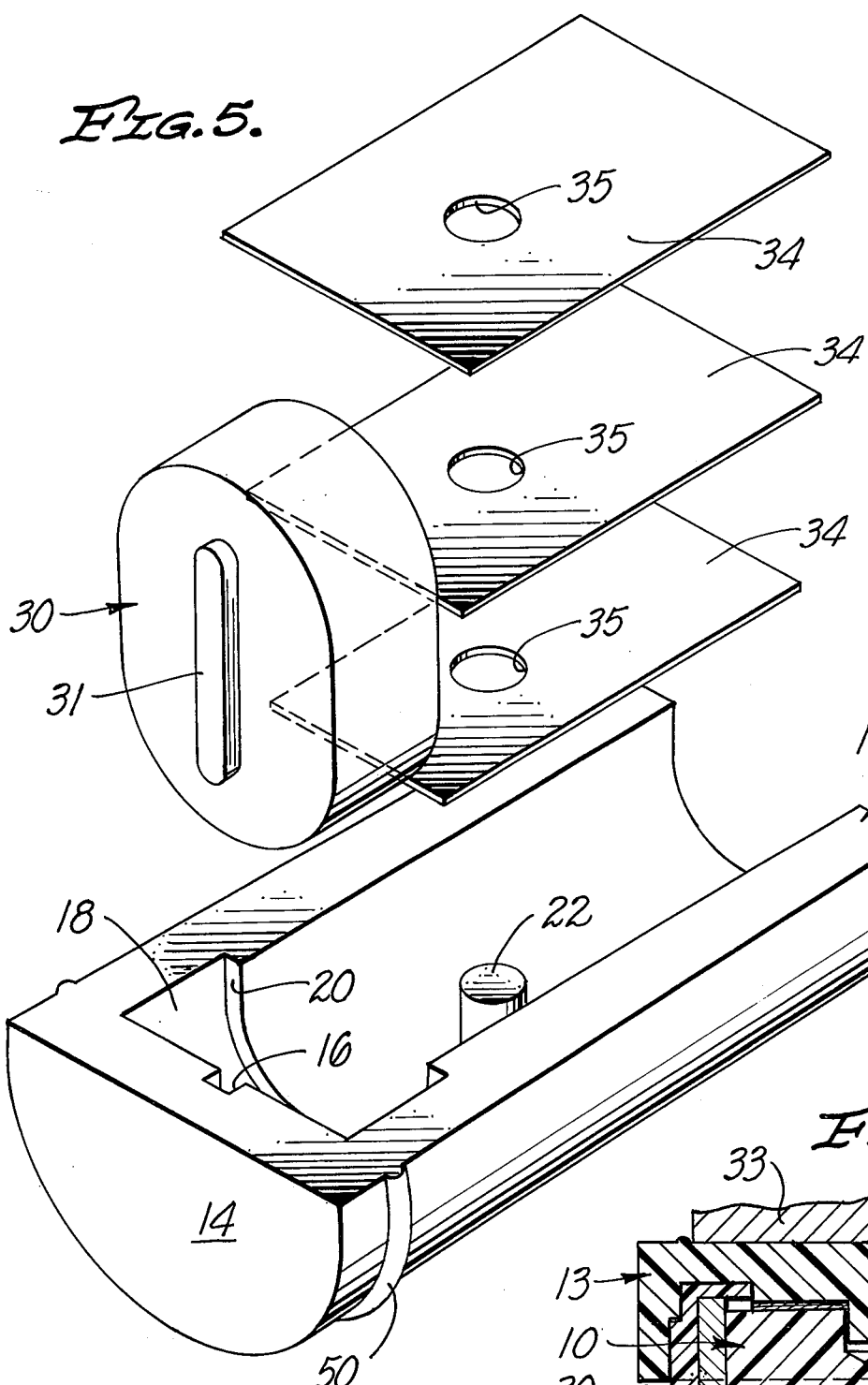
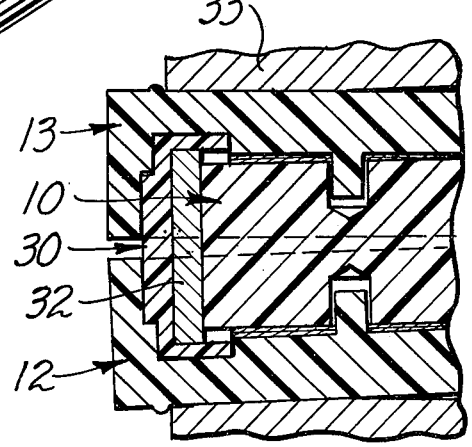

ADAPTER FOR FIBERGLASS TOOL HANDLES AND OTHER FIBERGLASS CONNECTIONS

BACKGROUND OF THE INVENTION

1. Field of the Invention

The invention relates to an adapter for use in attaching tool heads to fiberglass tool handles and for making other fiberglass attachments and connections.

2. Description of the Prior Art

This invention is an improvement upon the structure disclosed in my prior U.S. Pat. Nos. 3,753,602 and 3,819,288.

A fiberglass composite used for a handle shaft which provides the optimum performance characteristics due to its composition, i.e. a fiberglass shaft with all glass fibers in tension, continuous and parallel, does not offer a high level of compressive strength compared to tool heads which are predominently of hardened steel.

It has been found that when the handle shaft and the tool head are assembled in the field by driving the tool head onto the adapters which are attached to the handle shaft or by driving the handle with its attached adapters into the eyehole of the steel head, a wide range of force will be used by the average installer, who would virtually never have a means of measuring how much force he is applying. It is this force in an impact mode which is exerted on the handle shaft and adapter assembly, with extremely high loads when this impact is delivered on a solid surface such as concrete or a steel block.

Where variations in eyehole size are accommodated on the major axis by spacers but not on the minor and, to achieve the compressive forces on the handle shaft to assure permanent attachment (which by definition must provide that the two halves of the adapters not meet or bear on each other), full reliance is on the shaft in regard to compressive strength.

It has been found that overly zealous workers in the field have applied excessive compressive force against the major axis sides of the end of the fiberglass shaft, thereby delaminating it and causing the entire assembly to fail.

It has also been found that proper alignment of a plurality of parts having varying tolerances has been difficult to achieve.

SUMMARY OF THE INVENTION

The invention comprises a method of providing compressive strength when a handle shaft material is used that has lower compressive strength than the tool head or lower compressive strength than required by the mechanical or hand-driving of the assembly in the field.

Inasmuch as the compression load is exerted almost wholly on the major axis of the handle shaft that is in line with the striking faces or edges of the tool head, and frequently the insertion of spacers to accommodate the eyehole tolerances of the tool head leaves the minor axis of the shaft relatively unsupported, it is necessary to strengthen resistance to compressive loads on the major axis. To accomplish this, an alignment-/compression cap can be made of a material such as fiberglass filled nylon or equal, whose compression properties are considerably higher than the fiberglass handle, particularly at the unsupported end of the glass shaft, for smaller tools in which the total potential kinetic energy is low enough so that the cap in its design and inherent strength is adequate to resist the compression loads.

On those tools that create higher compressive loads, a metal plate that snugly fits into the base of the alignment/ compression cap is inserted prior to bonding the cap to the glass shaft.

The alignment/compression cap is preferably attached to the fiberglass shaft by using a liquid adhesive such as epoxy, so that the cap is in proper alignment with the shaft, regardless of tolerances or surface variations in the cap and/or shaft, since the epoxy flows to compensate for such variations.

The cap also serves as a master index to align holes which are drilled into the opposite sides of the fiberglass handle and which receive pins carried by the adapter halves, which pins also act to align and hold sizing spacers.

The adapters have in their upper sides rounded recesses which receive and fit around the opposite ends of the cap. The top of the cap has an upwardly directed tongue which fits into complementarily formed grooves disposed on the inside of the top surfaces of the adapter halves.

The cap accordingly serves a dual function of increasing the compressive strength and simultaneously aligning all of the component parts of the assembly with respect to the shaft, regardless of manufacturing variations and tolerances.

It is accordingly among the objects of the invention to provide an adapter having all of the advantages and benefits of the structure set forth above and described in further detail hereinafter in this specification.

Another object of the invention is to provide an adapter of the type described which is simple to manufacture and which is simple and substantially foolproof to use, particularly in the field.

DESCRIPTION OF THE DRAWINGS

FIG. 5 is an exploded isometric view of one of the adapter sections, the cap and three spacers;

FIG. 6 is a fragmentary longitudinal sectional view of an alternative embodiment of cap with a reinforcing plate therein, the thickness of the plate being variable as required.

DESCRIPTION OF THE PREFERRED EMBODIMENT

Figure 1:
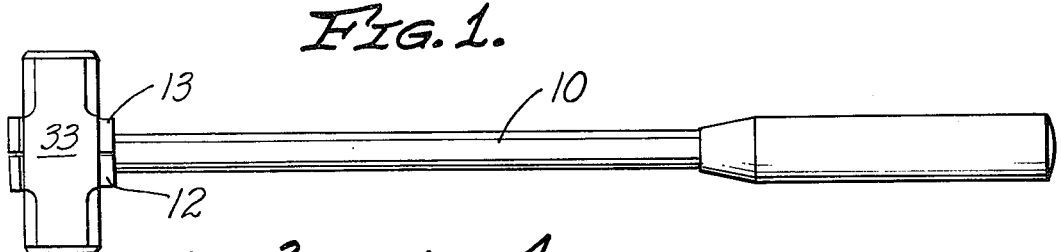
FIG. 1 is a side elevational view on a reduced scale of a handle with the adapter and tool head mounted thereon.
Figure 2:
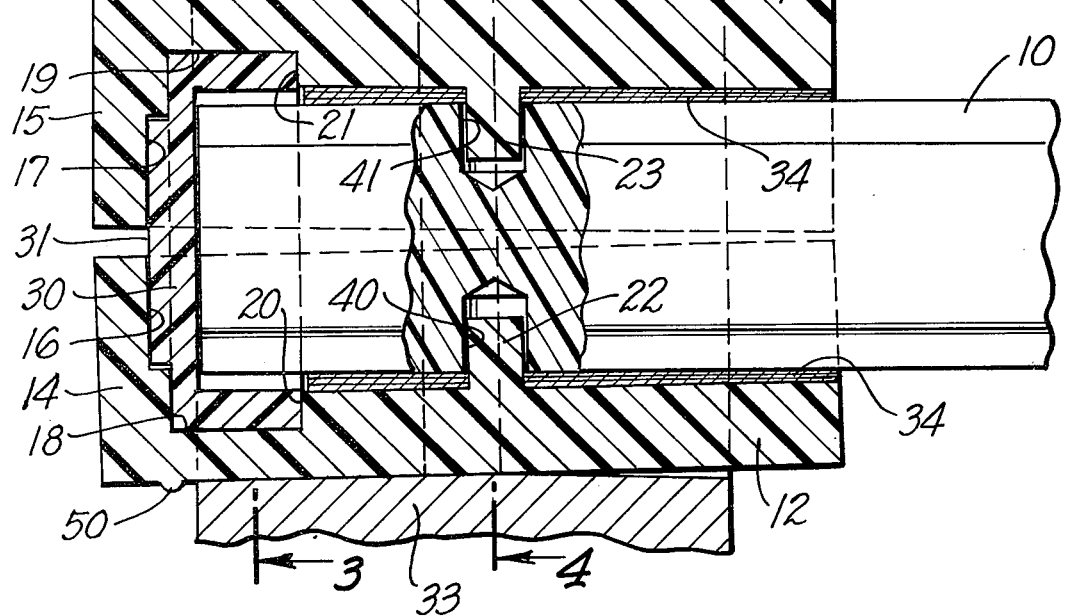
FIG. 2 is a longitudinal sectional view of the same, with three spacers in each of the adapter sections, the thickness of the spacers being substantially exaggerated for purposes of illustration.
Figure 3:
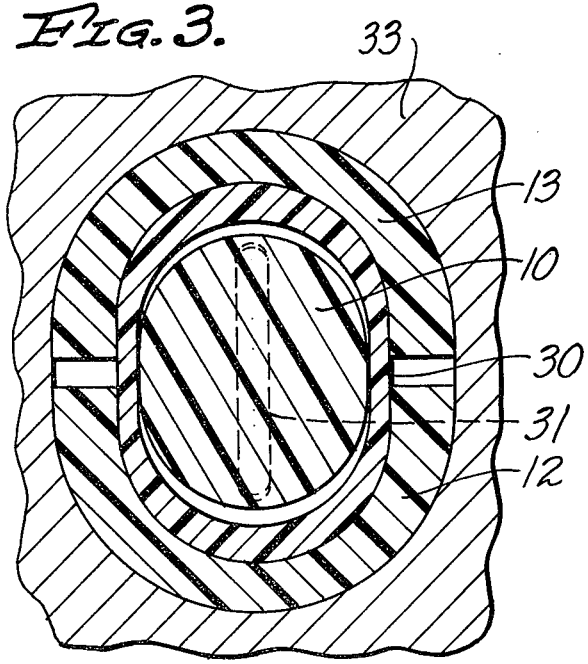
FIG. 3 is a transverse sectional view of the same taken on line 3—3 of FIG. 2.
Figure 4:
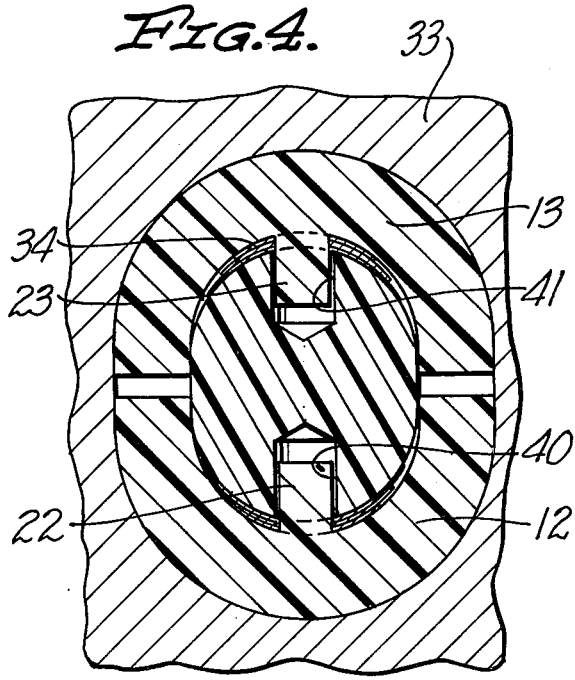
FIG. 4 is a transverse sectional view of the same taken on line 4—4 of FIG. 2.

A preferred embodiment which has been selected to illustrate the invention comprises a fiberglass elongated member 10, which may comprise the handle of a tool or a rod or other member to which a connection or attachment is to be made. The particular elongated member which is shown and described herein is oval in cross section, having two parallel longer flat sides joined by rounded edges.

A pair of identically formed adapter sections 12 and 13 are substantially semi-circular in cross section. The adapter sections 12 and 13 have closed top walls 14 and 15 which have on their lower or inside surfaces grooves 16 and 17 respectively which extend inwardly from the straight edges of the top walls 14 and 15.

Directly beneath their top walls 14 and 15, the insides of the adapter sections 12 and 13 are provided with recesses 18 and 19 which follow the contour of the inside walls of the adapter sections 12 and 13. The upper edges of the recesses 18 and 19 are defined by the top walls 14 and 15 and their lower edges are defined by ledges 20 and 21.

Spaced downwardly from the recesses 18 and 19 are inwardly directed pins 22 and 23 which are circular in cross section and which serve a dual purpose as described hereinafter A cap 30 has an oval cross sectional configuration which is complementary to that of the elongated member or handle 10. The interior dimensions of the cap 30 are only slightly greater than the exterior dimensions of the handle 10, so that the cap 30 is adapted to fit on the end of the member 10.

The adapter sections 12 and 13 and the cap 30 are preferably formed by molding glass filled nylon, which has the desired strength and high coefficiency of friction. It is particularly desirable for the compressive strength of the cap 30 to be substantially greater than that of the handle 10, so that when the cap 30 is in place on the handle 10, the handle 10 cannot be damaged by the application of a higher degree of compressive force than it can normally withstand alone. Other suitable materials having comparable properties may also be used, including various plastics, aluminum, zinc and other materials from which the cap 30 may be molded or formed.

The top of the cap 30 is provided with an elongated ridge 31, which is formed complementarily to the grooves 16 and 17 in the adapter sections 12 and 13.

In use, the cap 30 is first mounted on one end of the handle 10, preferably with the use of a liquid adhesive such as epoxy resin. Through the use of simple jigs and technique of types well known to those skilled in the art, the cap 30 can be correctly and precisely aligned with the handle 10. The liquid adhesive flows into and fills any surface or tolerance variations which may be present in the handle 10 and cap 30. The adhesive then hardens to hold the cap in proper position with respect to the handle 10.

The cap 30 thereafter serves as a guide and reference point for proper precise alignment of the remaining portions of the assembly. After the cap 30 is in place, the adapter sections 12 and 13 are fitted around the ends of the cap 30, which is formed complementarily to and fits within the recesses 18 and 19.

The depth of the recesses 18 and 19 is substantially equal to the wall thickness of the cap 30, so that when the cap 30 is disposed within the recesses 18 and 19 the inside surface of the cap 30 is substantially in alignment with the inside surfaces of the adapter sections 12 and 13 beneath the ledges 20 and 21. The adapter sections 12 and 13 are accordingly in engagement with the cap 30 and with the handle 10 simultaneously.

A pair of openings 40 and 41 having circular cross sections are drilled into opposite sides of the handle 10 complementarily to and in alignment with the pins 22 and 23 carried by the adapter sections 12 and 13. The openings 40 and 41 are preferably drilled after the cap 30 has been mounted on the handle 10 and the adapter sections 12 and 13 mounted around the cap 30 and handle 10.

After the openings 40 and 41 have been drilled, the adapter sections 12 and 13 are mounted around the cap 30, with the ridge 31 on the top of the cap 30 fitting within the grooves 16 and 17 formed in the top walls 14 and 15 of the adapter sections 12 and 13. The fit between the ridge 31 and the grooves 16 and 17 is preferably very close, with little or no tolerance.

If the cap 30 is used on a tool which has high compressive loads due to its size and/or use, a metal plate 32 may be inserted to fit snugly within the cap 30 against the inside of its top wall. The plate 32 is of a proper thickness and heat treat to accommodate the size and weight of the tool whose compressive loads must be resisted.

In order to adjust for variations in the thickness of the handle 10 and variations in the handle receiving opening of the tool head 33, a plurality of spacers 34 may be provided. The spacers 34 are each approximately 15/1000 inch in thickness. They may be formed of any suitable material, but fiber has been found particularly satisfactory in use. Other materials such as vinyl, fiberglass or phenolic sheet, insulating type fish paper or other comparable material may also be used.

Each of the spacers 34 is provided adjacent its upper end with a circular opening 35 which is dimensioned to fit around either of the pins 22 and 23 which are formed on the interior of the adapter sections 12 and 13. The spacers 34 are thereby held in proper position within the adapter sections 12 and 13. The spacers 34 are preferably arranged so that the first spacer inserted in the adapter section is narrowest in width and the remaining spacers are progressively wider. Three spacers 34 in each of the adapter sections 12 and 13 have been found to be the maximum required to compensate for dimensional variations in the handle 10 and opening of the tool head 33.

After the cap 30 and adapter sections 12 and 13 have been assembled on the end of the handle 10 and the assembly inserted into the opening of the tool head 33, the assembly is inverted and the top of the adapter sections 12 and 13 pounded upon the ground to cause the tool head 33 to move downwardly with respect to the handle 10. The adapter sections 12 and 13 are provided on their outer walls with guide ridges 50 and 51 which indicate approximately where the top of the tool head 33 should reach. If it does not reach this point, one or more spacers can be removed until the proper positioning is achieved.

It will be seen that the cap 30 serves as a compression cap which protects the end of the fiberglass handle against excessive compressive force applied against it during the assembly operation and/or in use.

The cap 30 also serves as an alignment cap to keep components of the assembly in proper alignment with the handle 10 so that the tool head 33 is mounted in proper alignment with respect to the handle 10.

I claim

1. An adapter for connecting a tool head to a fiberglass tool handle and for making other attachments to fiberglass members in which the tool head or other member has an opening in which the end of the handle or the like is inserted, said adapter comprising a closed cap dimensioned to fit closely over the end of said handle, a pair of adapter sections having a combined exterior formed substantially complementarily to the interior of said tool head opening, said adapter sections being mounted in overlying relationship to said cap and in engagement with the adjacent exterior of said handle so that said handle portion and cap are substantially completely enclosed by said adapter sections, each of said adapter sections having a recess formed complementarily to and adapted to fit around one end of said cap, the depth of said recess being substantially equal to the wall thickness of said cap, said cap having greater compressive strength than said handle to prevent damage to the end of said handle by excessive compressive force directed against it during assembly or use, said cap also acting as a guide to provide proper alignment of said adapter sections and tool head with respect to said handle.

2. The structure described in claim 1, and engagement means extending between the interior of each of said adapter sections and said tool handle to hold said adapter sections in alignment with said handle and prevent longitudinal movement of said adapter sections with respect to said handle.

3. The structure described in claim 2, said engagement means comprising a pin extending inwardly from each of said adapter sections into a complementarily formed opening in said handle.

4. The structure described in claim 3, and a plurality of spacers adapted to be mounted inside said adapter sections, each of said spacers having an opening adapted to fit around one of said pins.

5. The structure described in claim 1, the top of said cap having an upwardly directed elongated ridge formed integrally therewith, the top wall of each of said adapter sections having an elongated inwardly directed groove formed therein and adapted to engage one end of said ridge.

6. The structure described in claim 5, and engagement means comprising a pin extending inwardly from each of said adapter sections into a complementarily formed opening in said handle.

7. The structure described in claim 6, and a plurality of spacers adapted to be mounted inside said adapter sections, each of said spacers having an opening adapted to fit around one of said pins.

8. The structure described in claim 7, said cap being held in proper alignment with said handle by liquid adhesive which hardens to fill surface and tolerance variations in the engaging surfaces of said handle and tool head.

* * * * *